United States Patent
Key

(10) Patent No.: US 11,147,271 B2
(45) Date of Patent: Oct. 19, 2021

(54) CHEMICALS WHICH ALTER THE PRODUCTION OF METABOLITES IN CULTIVATED PLANTS

(71) Applicant: IMPELLO BIOSCIENCES, INC., Fort Collins, CO (US)

(72) Inventor: Michael Key, Fort Collins, CO (US)

(73) Assignee: Impello Biosciences, Inc., Fort Collins, CO (US)

(*) Notice: Subject to any disclaimer, the term of this patent is extended or adjusted under 35 U.S.C. 154(b) by 356 days.

(21) Appl. No.: 16/118,415

(22) Filed: Aug. 30, 2018

(65) Prior Publication Data

US 2019/0059371 A1    Feb. 28, 2019

Related U.S. Application Data

(60) Provisional application No. 62/552,084, filed on Aug. 30, 2017.

(51) Int. Cl.
   *A01N 37/42* (2006.01)
   *A01N 59/00* (2006.01)
   *A01N 37/40* (2006.01)
   *C05F 11/10* (2006.01)

(52) U.S. Cl.
   CPC ............ *A01N 37/42* (2013.01); *A01N 37/40* (2013.01); *A01N 59/00* (2013.01); *C05F 11/10* (2013.01)

(58) Field of Classification Search
   CPC ................................ A01N 37/40; A01N 37/42
   See application file for complete search history.

(56) References Cited

U.S. PATENT DOCUMENTS

| | | | |
|---|---|---|---|
| 8,013,226 B2 | 9/2011 | Scheer et al. | |
| 10,874,102 B2 | 12/2020 | Heldreth, Jr. | |
| 2009/0082453 A1 | 3/2009 | Scheer et al. | |
| 2015/0230462 A1* | 8/2015 | Scheer ........... | A01N 37/42 504/100 |

FOREIGN PATENT DOCUMENTS

EP 1750507 * 12/2015 ............. A01N 37/40
WO WO 2005/118508 A2 12/2005

OTHER PUBLICATIONS

Shaggy's Guide to Hormones used in Cannabis post dated Mar. 6, 2014 https://www.icmag.com/forum/marijuana-growing/cannabis-botany-and-advanced-growing-science/281382-shaggy-s-guide-to-hormones-used-in-cannabis/page2 accessed Aug. 2, 2021.*
Shirin et al. ("Studying the Priming Impact With Distilled Water and Salicylic Acid on the Enzymatic Anti-Oxidant and the Infusion of Hemp Germination" Journal of Research in Crop Sciences.*
Ahmad, P. et al. (Jun. 2016) Jasmonates: Multifunctional Roles in Stress Tolerance. Front Plant Sci, 7:813, doi: 10.3389/fpls.2016.00813, 15 pages.

(Continued)

*Primary Examiner* — Kortney L. Klinkel
(74) *Attorney, Agent, or Firm* — Cooley LLP

(57) ABSTRACT

Elicitors are applied to cultivated crops in order to improve plant productivity and/or harvestable crop value in agricultural and horticultural operations providing increased production of metabolites in cultivated plants.

21 Claims, 17 Drawing Sheets

(56) References Cited

OTHER PUBLICATIONS

Bailey, Rachel (2019) The Effect of Elicitor Stimulation on Cannabinoid Production by Industrial Hemp (*Cannabis sativa*) Varieties in a Hydroponic System. A thesis presented to the Honors College of Middle Tennessee State University in partial fulfillment of the requirements for graduation from the University Honors College [online]. Retrieved from: https://jewlscholar.mtsu.edu/handle/mtsu/6091; 28 total pages.

Birkett, M.A. et al. (2000) New roles for cis-jasmone as an insect semiochemical and in plant defense. PNAS, 97(16):9329-9334.

Bruce, T. et al. (2003). Cis-Jasmone switches on plant defence against insects. Pesticide Outlook, 14(3):96-98.

Cappellari, L.d.R. et al. (2020) Improving Phenolic Total Content and Monoterpene in *Mentha x piperita* by Using Salicylic Acid or Methyl Jasmonate Combined with Rhizobacteria Inoculation. Int J Mol Sci, 21:50, 22 pages.

Chen, X. et al. (2019) Full-length transcriptome sequencing and methyl jasmonate-induced expression profile analysis of genes related to patchoulol biosynthesis and regulation in *Pogostemon cablin*. BMC Plant Biol, 19:266, https://doi.org/10.1186/sl2870-019-1884-x, 18 pages.

Gabotti, D. et al. (2019) Cell Suspensions of *Cannabis sativa* (var. Futura): Effect of Elicitation on Metabolite Content and Antioxidant Activity. Molecules, 24(22):4056, doi:10.3390/molecules24224056, 18 pages.

Gajalakshmi, S. et al. (2013) Pharmacological activities of Catharanthus roseus: A perspective review. International Journal of Pharma and Bio Sciences. 4:431-439.

Gorelick, J. & Bernstein, N. (2017) Chemical and Physical Elicitation for Enhanced Cannabinoid Production in Cannabis. In Cannabis Sativa L.—*Botany and Biotechnology*. Springer International Publishing AG, pp. 439-456, doi: 10.1007/978-3-319-54564-6_21.

Kim, Hyun-Jin et al. (2007) Effect of Methyl Jasmonate on Phenolic Compounds and Carotenoids of Romaine Lettuce (*Lactuca sativa* L.). Journal of Agricultural and Food Chemistry, 55(25): 10366-10372.

Kim, Hyun-Jin et al. (2011)Metabolomic Analysis of Phenolic Compounds in Buckwheat (*Fagopyrum esculentum* M.) Sprouts Treated with Methyl Jasmonate. Journal of Agricultural and Food Chemistry, 59(10):5707-5713.

Li, L. et al. (2017) Increased antioxidant activity and polyphenol metabolites in methyl jasmonate treated mung bean (*Vigna radiata*) sprouts. Food Science and Technology, Campinas, 37(3):411-417. Epub May 11, 2017, https://dx.doi.org/10.1590/1678-457x.15716.

Li, L. et al. (2019) Increased polyphenols and antioxidant activity of rice bean (*Vigna umbellata* L.) sprouts induced by Methyl Jasmonate: the promotion effect of Methyl Jasmonate on rice bean sprouts. Food Science and Technology, Campinas, 39(Suppl. 1):98-104. Epub Dec. 13, 2018, https://dx.doi.org/10.1590/fst.36717.

Luo, Hao et al. (2020) Effect of methyl jasmonate on carotenoids biosynthesis in germinated maize kernels. Food Chemistry, 307:125525, https://doi.org/10.1016/j.foodchem.2019.125525, 8 pages.

Mohamed, H.I. and Latif, H.H. (2017) Improvement of drought tolerance of soybean plants by using methyl jasmonate. Physiol Mol Biol Plants, 23:545-556.

Mustafa, M.A. et al. (2016) Enhancing the antioxidant content of carambola (*Averrhoa carambola*) during cold storage and methyl jasmonate treatments. Postharvest Biology and Technology, 118:79-86.

Pan, Ya-jie et al. (2018) Transcriptomics comparison reveals the diversity of ethylene and methyl-jasmonate in roles of TIA metabolism in *Catharanthus roseus*. BMC Genomics, 19:508, https://doi.org/10.1186/s12864-018-4879-3, 14 pages.

Paprocka, M. et al. (2018). Novel Hydroxy- and Epoxy-cis-Jasmone and Dihydrojasmone Derivatives Affect the Foraging Activity of the Peach Potato Aphid *Myzus persicae* (Sulzer) (Homoptera: Aphididae). Molecules, 23(9):2362, doi:10.3390/molecules23092362, 16 pages.

Pickett, J.A. et al. (2007) cis-Jasmone as allelopathic agent in inducing plant defence. Allelopathy Journal, 19(1):109-118.

Quintana-Rodriguez, E. et al. (2018) Shared weapons in fungus-fungus and fungus-plant interactions? Volatile organic compounds of plant or fungal origin exert direct antifungal activity in vitro. Fungal Ecology, 33:115-121.

Reyes-Díaz, M. et al. (2016) Methyl Jasmonate: An Alternative for Improving the Quality and Health Properties of Fresh Fruits. Molecules, 21(6):567, https://doi.org/10.3390/molecules21060567, 18 pages.

Sakamoto, M. and Suzuki, T. (2017) Synergistic Effects of a Night Temperature Shift and Methyl Jasmonate on the Production of Anthocyanin in Red Leaf Lettuce. American Journal of Plant Sciences, 8:1534-1549, doi: 10.4236/ajps.2017.87106.

Sharifzadeh Naeini, M. et al. (2021) Production of some benzylisoquinoline alkaloids in *Papaver armeniacum* L. hairy root cultures elicited with salicylic acid and methyl jasmonate. In Vitro Cell Dev Biol—Plant, 57:261-271.

Fine Americas, Inc. (2012) *Blush™ Technical Information Bulletin*. 2 pages.

Konan, Y.K.F. et al. (2014) "Effect of Methyl Jasmonate on Phytoalexins Biosynthesis and Induced Disease Resistance to *Fusarium oxysporum f. sp. Vasinfectum* in Cotton (Gossypium hirsutum L.)" Int J Agron, vol. 2014, Article ID 806439; 11 pages.

Lundborg, L. et al. (2016) "Methyl Jasmonate-Induced Monoterpenes in Scots Pine and Norway Spruce Tissues Affect Pine Weevil Orientation" J Chem Ecol, 42(12): 1237-1246.

Riet, K.B et al. (2016) "Simultaneous analysis of defense-related phytohormones in *Arabidopsis thaliana* responding to fungal infection" ApplPlant Sci, 4(8):1600013, doi:10.3732/apps.1600013; 9 pages.

Ziosi, V. et al. (2008)" Jasmonate-induced transcriptional changes suggest a negative interference with the ripening syndrome peach fruit" J Exp Botany, 59(3):563-573.

* cited by examiner

CHEMICALS WHICH ALTER THE PRODUCTION OF METABOLITES IN CULTIVATED PLANTS

This application claims benefit of U.S. Provisional Patent Application Ser. No. 62/552,084 filed Aug. 30, 2017 and is hereby incorporated by reference in its entirety.

FIELD OF THE INVENTION

The present invention involves adding chemical and biochemical compounds to cultivated crops in order to improve plant productivity and/or harvestable crop value in agricultural and horticultural operations. More specifically, the invention describes isolations, compositions and combinations of chemical elicitors wherein increased activity is provided and the compositions and combinations provide increased production of metabolites in cultivated plants.

BACKGROUND

Cells and tissues of all organisms must respond and adapt to changes in external environmental conditions. In many cases, cells contain specific receptors for particular chemicals. When such chemicals come into contact with cell surfaces, they bind specifically to particular receptors. This binding then triggers a cascade of events within the cells, including up- and down-regulation of genes and activation or repression of specific pathways within the cells. Those processes result in substantial changes in cellular physiology. Thus, these elicitors are triggers of dramatic physiological responses. Moreover, a very small quantity of the elicitor molecule is often sufficient to cause major changes in cellular physiology. Such compounds generally are effective at micromolar concentrations. An understanding of such elicitors has a major impact on cellular physiology and permits metabolic engineering to achieve beneficial changes in organismal activity.

Plants produce both primary (essential) and secondary (non-essential) metabolites during growth. Secondary metabolites are not necessary for the plant's survival but are small molecules (MW<1,000 g/mol) that contribute to plant growth, development, defense, and reproductive capabilities. Numerous secondary metabolites, including alkaloids, terpenoids and isoprenoids, and phenolics, among others, have commercial value in industries ranging from nutraceuticals to pharmaceuticals to agrochemicals. Previously, elicitation has been utilized on cell suspensions and in vitro plant cultures to induce the production of some plant-derived secondary metabolites, but these applications have generally been limited to the large-scale production of plant products that are not adequately produced in planta. Such products are suitable for in vitro production because both the organic synthesis and the extraction yield of such natural products from in planta applications is impractical from cost standpoints. Elicitors have been used in agricultural applications to promote systemic acquired resistance for crop protection but have not been used to increase crop value.

content; a second graph comparing MeJA+SiA+SA treatment vs. non-elicitor control measuring myrcene (mg/g) content.

Figure 15:
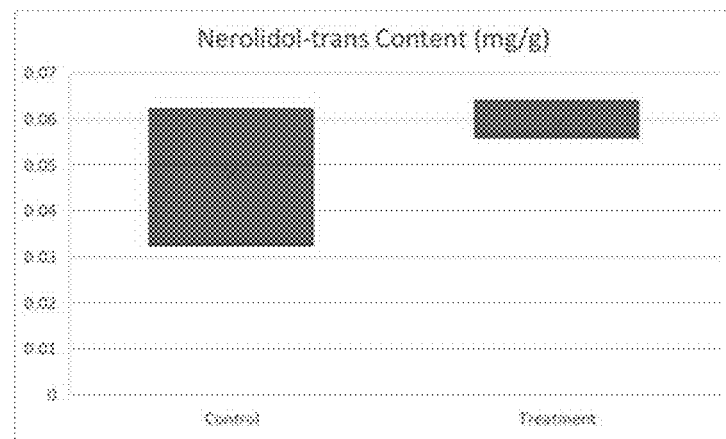
Figure 15:
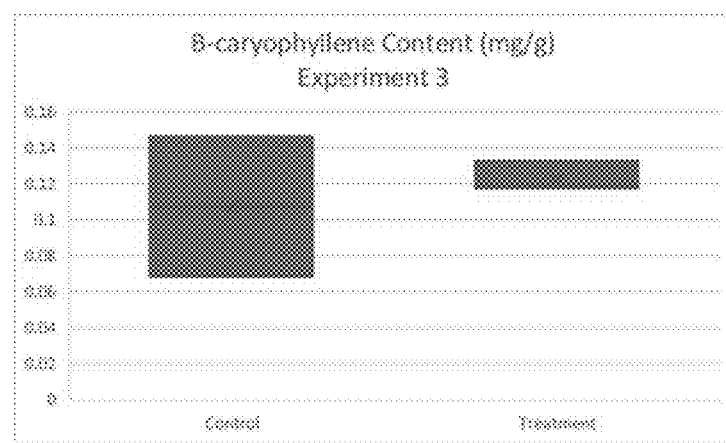

FIG. 15 is a first graph comparing MeJA+SiA+SA treatment vs. non-elicitor control measuring Nerolidol-trans (mg/g) content; a second graph comparing MeJA+SiA+SA treatment vs. non-elicitor control measuring B-caryophyllene (mg/g) content.

Figure 16:
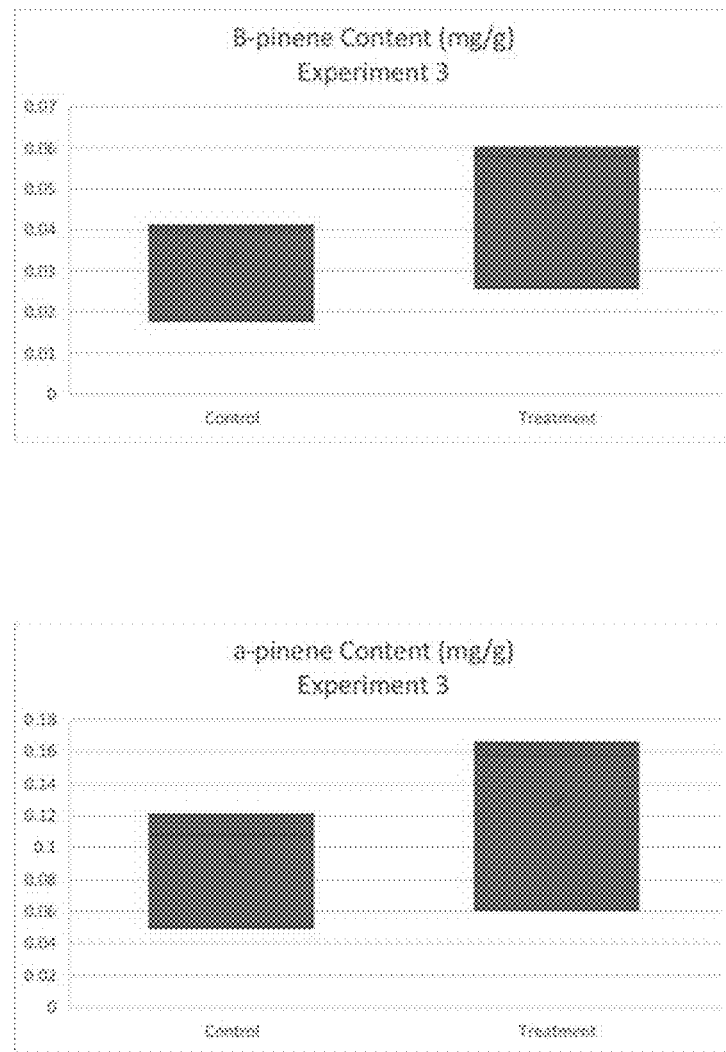

FIG. 16 is a first graph comparing MeJA+SiA+SA treatment vs. non-elicitor control measuring B-pinene (mg/g) content; a second graph comparing MeJA+SiA+SA treatment vs. non-elicitor control measuring a-pinene (mg/g) content.

Figure 17:
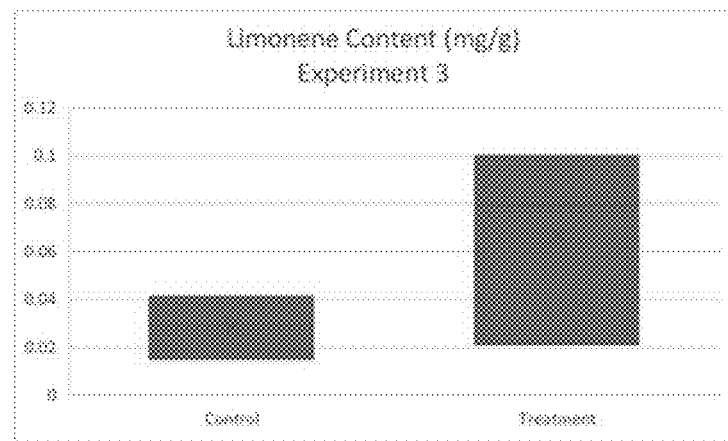
Figure 17:
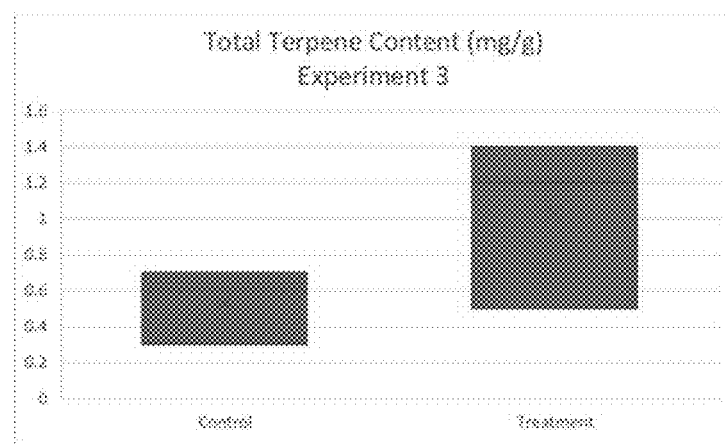

FIG. 17 is a first graph comparing MeJA+SiA+SA treatment vs. non-elicitor control measuring limonene (mg/g) content; a second graph comparing MeJA+SiA+SA treatment vs. non-elicitor control measuring total terpene (mg/g) content.

SUMMARY

Chemical and/or biochemical isolates and mixtures are used herein to stimulate the biosynthesis of plant metabolites in plants, altering the content of phytochemicals in harvestable plant parts, ultimately increasing crop value. Applications include but are not limited to *Cannabis* crop varieties known as hemp and marijuana varieties.

In a preferred embodiment at least one elicitor is required for increasing production of one or more selected inherent plant chemicals which have value in plant cultivation comprising applying an effective amount of at least one elicitor to plant cells being cultivated after which the selected inherent plant chemical production is increased. The at least one elicitor may be a composition of two or more elicitors selected from the group consisting of Methyl Jasmonate, Jasmonic Acid, Methyl salicylate, Salicylic Acid, Silicic acid and their homologues or isomers or derivatives. The composition may be applied to plant cells in the form of seed, clone stock, flowers, roots, leaves, or other plant tissue. The inherent plant chemicals may be selected from the group consisting of secondary metabolites, phytochemicals, colors, aromas, flavors, acids and phenolics. The selected time points are determined such that increased production of selected inherent plant chemicals occurs. The composition may be applied using a foliar spray, a root drench or a gas to subterranean plant cells and/or aerial plant cells.

In preferred embodiments, compositions will include components such as additives, auxiliaries, and excipients in addition to the primary chemical ingredients. Additional components may act to improve the stability of the composition, improve the homogeneity of the composition, improve the function of the composition in planta, or provide other qualities to the composition and/or to the methodology of the present disclosure. Possible additional components include amino acids, minerals, salts, solvents, stabilizers, surfactants, hormones, enzymes, vitamins, chitin, chitosan, carboxylic acids, carboxylic acid derivatives, linoleic acid and other fatty acids, volatile organic compounds (VOCs), microbial consortia or isolates, bioregulators, biostimulants, and other additives known in the art to elicit a biological, biochemical, physiological, and/or physiochemical response from the plant, or to stabilize the composition, or to elicit specific metabolite production in the plant.

The compositions disclosed herein include liquid and/or dry forms and include dry stock components that are added to water or other liquids prior to application to the plant in an aqueous form. Liquid compositions include aqueous, polar, or non-polar solutions. The compositions may be provided in concentrated or diluted forms. In a preferred embodiment, the composition is diluted. In another preferred embodiment, the composition is concentrated. In yet another preferred embodiment the composition is aqueous.

Methods include using the disclosed composition to increase the value of cultivated plants. The composition can be applied to seed, seedling, clone stock, vegetative tissues, root tissues, flowering tissues, and mature plant parts. The composition may be applied in liquid or dry form. The composition may be applied to the soil, to the plant, or to both the soil and the plant. The composition may be applied to plant parts using methods known in the art, such as foliar spray, atomization, fumigation, or chemigation. The composition may be applied to the soil using methods known in the art such as irrigation, chemigation, fertigation, or injection. The composition may be applied to a soil or a water or a carbon dioxide or a fertilizer source, including hydroponic and aeroponic and carbon dioxide injection systems, which is delivered to the plant in a liquid, dry, or gaseous form. In preferred embodiments, the plant may be grown indoors or outdoors, in a controlled or uncontrolled environment, in fields or in containers. The plant may be grown in soil-based media, soil-less media, or a media containing both soil-less and soil-based components. The plant may be grown in coco, rockwool, peat moss, or other acceptable medias well-known in the art. The plant may be grown in indoor or outdoor environments with organic (Carbon-based), inorganic (synthetic), or a combination of both, fertilizers, amendments, adjuvants, pesticides, and supplements. In preferred embodiments where the composition is applied to immature plants, seeds, or seedlings, the composition may also be applied to the soil or plant later in the plant's life prior to harvest, or applications of the composition may be repeated prior to harvest. When the composition is applied to growing plant parts or flowers, the same composition may be reapplied at a later stage of growth, or a different composition may be applied at the same time or at a later stage of growth, or both.

Methods further include application to living or dormant plant tissues, both above-ground and below-ground, to alter the biosynthesis and/or overall yield of valuable plant products to increase the value of the crop relative to its market.

DETAILED DESCRIPTION

Elicitors as Biostimulants to Alter Secondary Metabolite Production

Chemical compounds known as elicitors are plant signaling molecules that influence plant health, growth, and stress management. Elicitors may act on two primary plant signaling pathways—the salicylate and jasmonate pathways—that are responsible for modulating plant responses to abiotic and biotic stimuli. Salicylates (SA) are derivatives of salicylic acid that occur naturally in plants and serve as a natural immune hormone and preservative, protecting the plants against diseases, insects, fungi, and harmful bacteria. Jasmonates (JA) are lipid-based plant hormones that regulate a wide range of processes in plants, ranging from growth and photosynthesis to reproductive development. In particular, JAs are critical for plant defense against herbivory and plant responses to poor environmental conditions and other kinds of abiotic and biotic challenges. Plants direct significant energetic resources to the production of compounds along these pathways during times of stress, herbivory, and pathogen invasion in order to better defend themselves from the stressor. The presence of these compounds in planta dictate numerous plant responses and alter gene expression, influencing biochemical synthesis pathways and inducing the production of secondary metabolites such as phenolics, stilbenoids, terpenes, and highly-specific compounds such as cannabinoids, whose endogenous production is generally recognized as limited to plant species within the *Cannabis* genera.

In preferred embodiments, Methyl Jasmonate (MeJA), Salicylic acid (SA), and Silicic Acid (SiA) are considered for use independently or as a mixture to alter the production of valuable secondary metabolites by contacting some part of the plant or its environment. One or more elicitors may be mixed with one or more auxiliaries, adjuvants, excipients, surfactants, or other chemicals. Elicitors may be applied simultaneously but separately from other plant growth products, such as nutrients and pesticides, for improved performance or facility.

The disclosed compositions and methods may be used to increase crop value by contacting young plants, seeds, clones or scions, vegetative plants, or other non-reproductive plant parts, or reproductive plant parts, to induce some desired response. The value of the crop may be determined by quantifying the concentration of secondary metabolites in plant parts with mass spectrometry, or by weight or volume measurements, or yield (concentration, weight, density, or relative abundance) of structures or organs, or by other physical or chemical means.

The disclosed compositions and methods are used to increase the value of *Cannabis* crops relative to crops not treated with the compositions and methods, or to increase the value of *Cannabis* crops relative to crops treated with other variations of the present disclosure and relative to the perceived market value of each plant component. In more than one iteration, the compositions and methods can be used to increase the production of valuable metabolites by weight, or to decrease the production of undesirable metabolites by weight, as determined by chemical analysis of plant or flower parts during the reproductive (i.e., flowering) phase of plant growth.

The profile of secondary metabolites in *Cannabis* plants can be the primary determinant of the crop's value. In hemp crops, low-THC varieties are not only mandated by law but coveted by consumers and cultivators. Hemp crops are generally utilized for their secondary metabolites produced in planta in flower organs, which are extracted and refined using various techniques such as lipid or hydrocarbon extractions. In high THC varieties, which are restricted to the marijuana markets, less emphasis is placed on the variety of secondary metabolites and greater emphasis is placed on the concentration of THCA and its derivatives. In both instances, the secondary metabolites of greatest interest are cannabinoids and terpenes.

EXAMPLES

Example I: Assessment of MeJA, SiA, and SA Eliciting Properties

Applicant tested the performance, both efficacy and effectiveness, of the eliciting compositions and methods to alter secondary metabolite production in a controlled environment with a commercial hemp varietal (Happy Camper, CBDRx LLC, Boulder, Colo.). The compositions demonstrate bioactivity in planta beyond what was hypothesized. Notably, the compositions applied demonstrated the ability to both increase and decrease the production of dominant secondary metabolites such as cannabidiol (CBD), cannabidiolic acid (CBDA), tetrahydrocannabinol (THC), tetrahydrocannabinolic acid (THCA), and common terpenes such as humulene, beta-caryophyllene, and myrcene. Our results show that positive results can be obtained from the application of both elicitors, depending on which secondary metabolites are of greatest interest to the applicator.

Applicant performed an indoor cultivation experiment with 30 identical *Cannabis* sp. hemp varietal clones (Happy Camper, CBDRx LLC, Colorado). Each of the thirty plants was randomly assigned to one of six treatment groups to test the efficacy and effectiveness of each elicitor compound in isolation or in combination. Plants were maintained in an isolated indoor growing environment under eight, 600-watt double-ended electronic high pressure sodium lamps (Gavita International B.V) under a photoperiod of 12 hours of light per 24-hour day and potted in 1-gallon black plastic pots with a 55% coco coir/45% perlite media (Miller Soils LLC, Longmont, Colo., USA), then transplanted into 10-gallon fabric pots (Smart Pot, High Caliper Growing, USA) filled with a mixture of 75% coco coir and 25% cork (DNA-Mills Ltd, London, England), irrigated as needed with tap water and fertilized consistently to maintain good health with a 4-20-39 base nutrient supplemented with 15-0-0 Calcium Nitrate and commercially available magnesium sulfate (Hydro Gardens International, Colorado Springs, Colo.) at a rate of 300-500 ppm (TDS) as needed. A microbial inoculant (Tribus Original, Impello Biosciences, Ft. Collins, Colo.) was applied at a rate of 1 mL/gallon of nutrient solution every watering to improve plant health. Drip emitters and an automated watering system supplied water and nutrients equally to each plant. Temperatures in the growing environment were maintained at 75° F.±15° F. with a relative humidity range of 30-60%. Every 14 days of growth, all plants were supplemented with a fish protein hydrolysate at a rate of 5 ml/gallon of the previously mentioned nutrient solution to improve nutrition (Innate Bloom 4-2-1, Impello Biosciences, Colorado).

Treatment groups included (1) applications of MeJA as a foliar spray at a concentration of 7.5 mM, (2) SA as a foliar spray at a concentration of 0.5 mM, (3) SiA as a root drench at a concentration of 3 mM, (4) MeJA as a foliar spray at a concentration of 7.5 mM and a root drench of SiA at a concentration of 3 mM, and (5) MeJA as a foliar spray at a concentration of 7.5 mM and a root drench of SiA at a concentration of 3 mM and foliar applications of SA at a concentration of 0.5 mM. The control group was not treated with any applications aside from normal fertilization. Foliar applications of MeJA were performed in the morning hours, within 30 minutes of daybreak, with applications covering plant leaves until dripping. Applications of SA for all SA treatment groups were performed in the morning hours, within 30 minutes of daybreak, with applications covering plant leaves until dripping. Applications of SiA were performed by hand additions of SiA mixtures at the desired concentration to the plant roots of treatment plants; control plants were treated with plain water in the same volume at the same time without the addition of SiA.

7.5 mM solutions of MeJA (mixture of isomers) were prepared in 1-liter volumes using 93% purity MeJA stock solution (TCI America, CAS #1101843-02-0) added to reverse osmosis water dropwise with a pipettor while stirring. The pH of the final solution was not adjusted. 0.5 mM solutions of SA were prepared from a 0.5M stock solution, which was prepared using Salicylic Acid powder (ThermoFisher Scientific, CAS #69-72-7), dissolved in 200-proof anhydrous EtOH, denatured (VWR Life Sciences) and stored in a sealed glass bottle. Plant-useable solution was prepared by diluting 1000₄, of the stock SA solution in 999 mL of reverse osmosis water. Foliar applications of MeJA and SA were made with a 1-L volume low-pressure hand-pump sprayer (Mondi Products LTD, Canada). Silicic Acid solutions were prepared as needed using Silicic Acid stock powder (extra pure light DAB, Millipore Sigma, CAS #7699-41-4), dissolved in reverse osmosis water to the desired final concentration.

Plants were maintained under identical conditions in the same growing environment. All plants were randomly arranged in the room using an online experiment randomizer tool (randomizer.com). Foliar treatments of SA and MeJA were performed with all environmental ventilation (exhaust and circulation fans) turned off to minimize overspray onto non-treatment plants, and plants were spatially separated. Treatments were applied according to a defined schedule. For all treatment groups receiving SA, applications occurred every 10 days, starting on day 0 of the reproductive cycle when the photoperiod was changed from 18 hours of light per day to 12 hours of light per day and applied again on days 10, 20, and 30. MeJA applications, for all treatment groups receiving MeJA, were applied every 14 days, starting on the 7th day of the reproductive cycle and applied again on days 21, 35, and 49. SiA applications, for all treatment groups receiving SiA, were applied weekly starting on day 1 of the reproductive cycle and continued through harvest.

Figure 1:
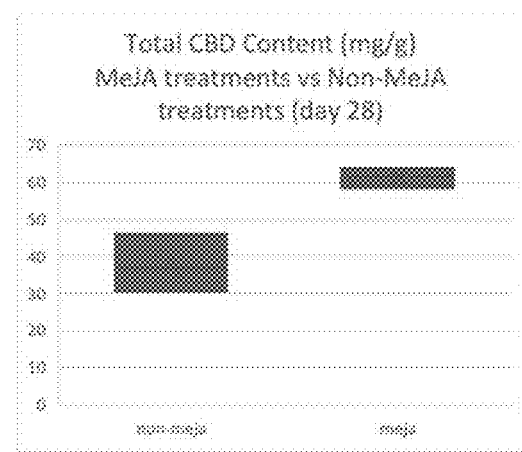
FIG. 1 is a first graph comparing MeJA vs. non-MeJA treatment measuring total Cannabinoid (mg/g) content and a second graph comparing MeJA vs. non-MeJA treatment measuring total CBD (mg/g) content at 28 days.
Figure 1:
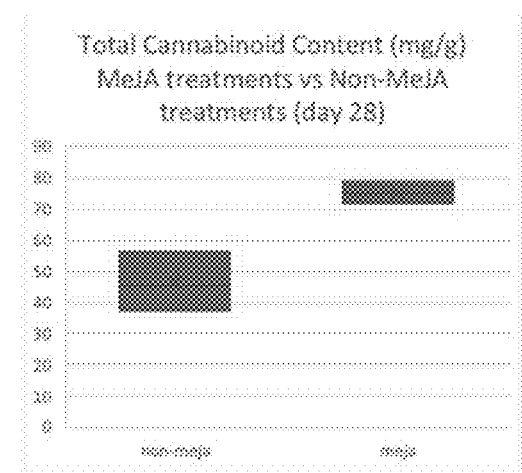
Figure 2:
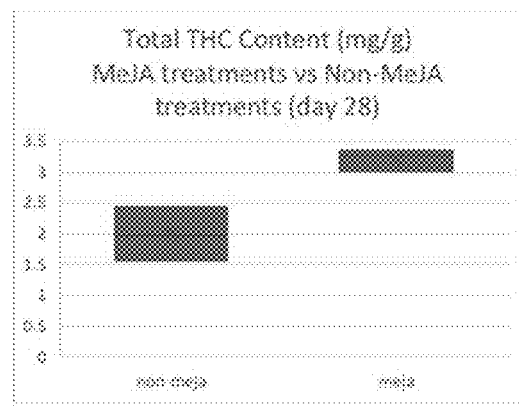
FIG. 2 is a first graph comparing MeJA vs. non-MeJA treatment measuring total THC (mg/g) content and a second graph comparing elicitors MeJA and/or SA and/or Si treatment vs. Control measuring total Terpene (mg/g) content at 28 days.
Figure 2:
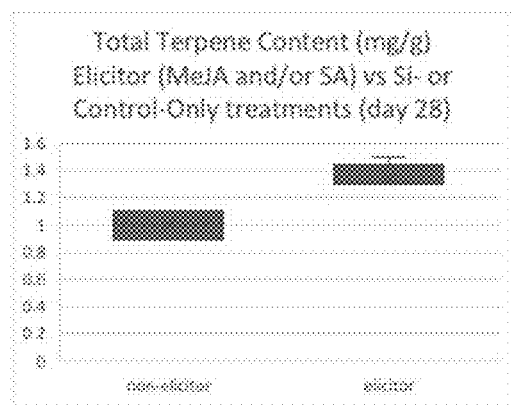
Figure 3:
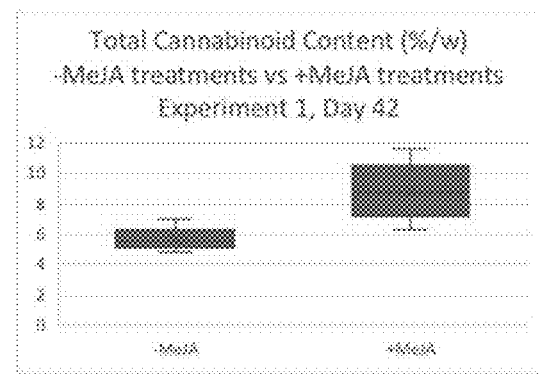
FIG. 3 is a first graph comparing MeJA vs. non-MeJA treatment measuring total Cannabinoid (%/w) content and a second graph comparing MeJA vs. non-MeJA treatment measuring total CBDA (%/w) content at 42 days.
Figure 3:
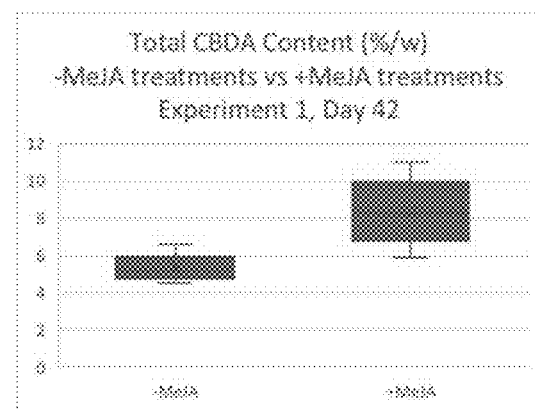
Figure 4:
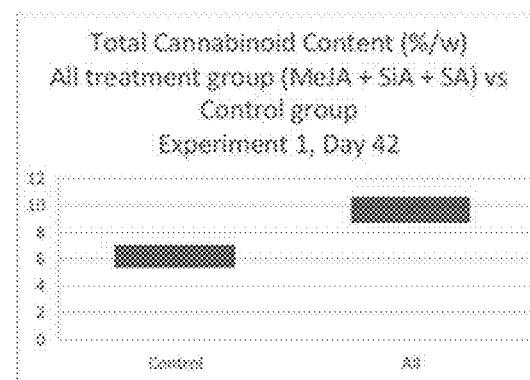
FIG. 4 is a first graph comparing MeJA+SiA+SA treatment vs. non-elicitor control measuring total Cannabinoid (%/w) content; a second graph comparing MeJA or MeJA+SiA or MeJA+SiA+SA vs. non-elicitor control measuring total Cannabinoid (%/w) content; and a third graph comparing MeJA vs. non-MeJA treatment measuring total THCA (%/w) content at 42 days.
Figure 4:
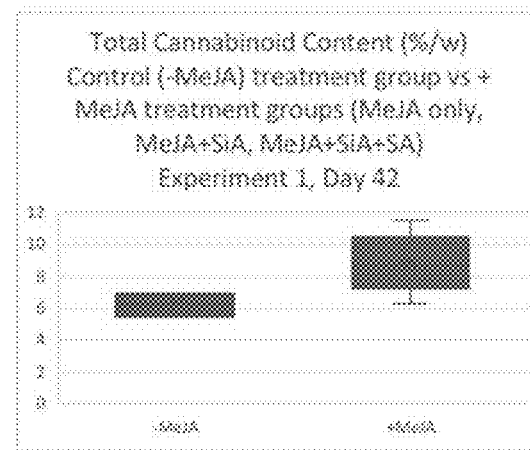
Figure 4:
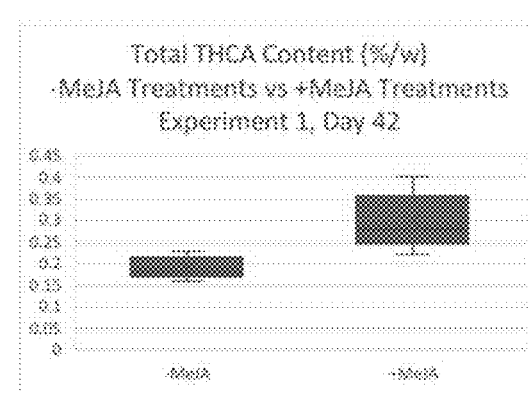
Figure 5:
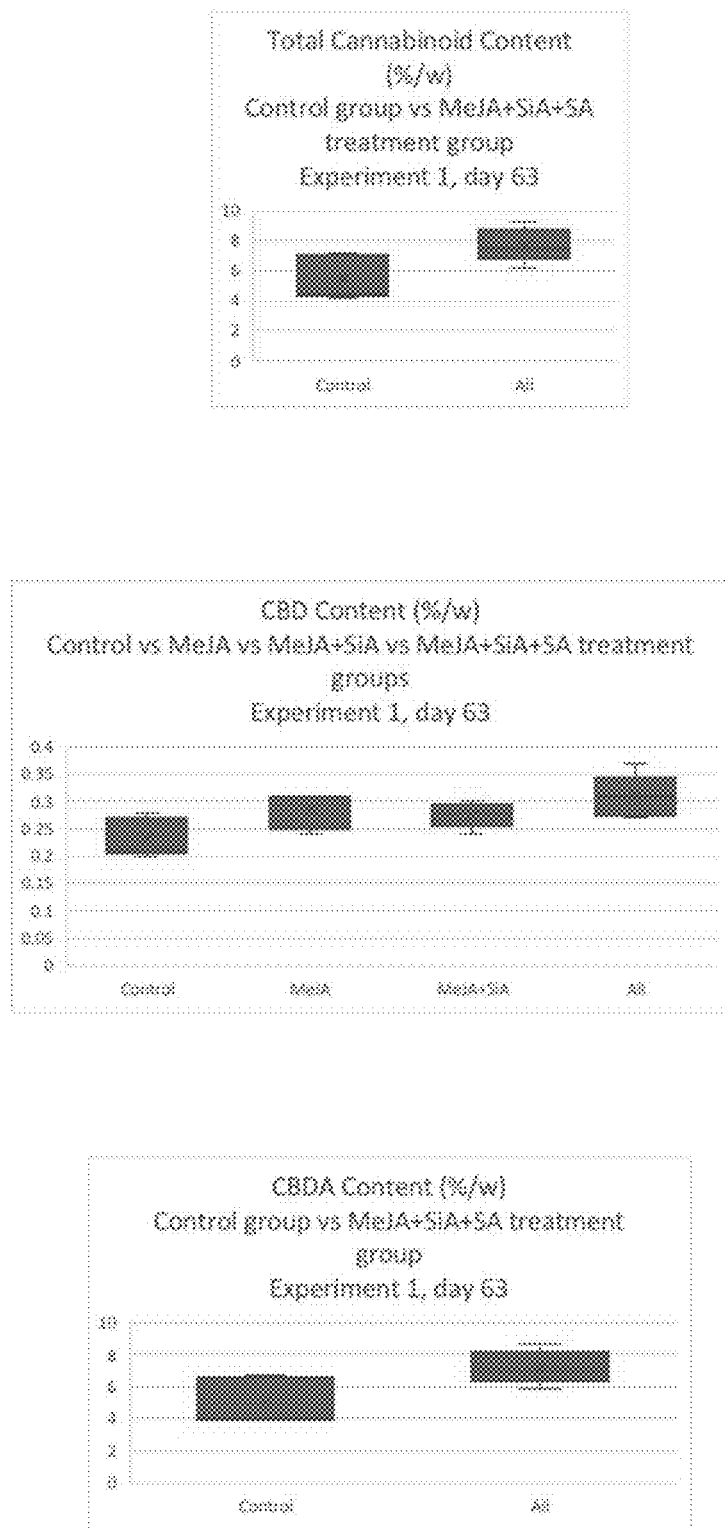
FIG. 5 is a first graph comparing MeJA+SiA+SA treatment vs. non-elicitor control measuring total Cannabinoid (%/w) content; a second graph comparing MeJA or MeJA+SiA or MeJA+SiA+SA vs. non-elicitor control measuring total CBD (%/w) content; and, a third graph comparing MeJA+SiA+SA treatment vs. non-elicitor control measuring total CBDA (%/w) content at 63 days.

Quantitative observations were made three times throughout the experiment. On day 28 of the reproductive cycle, approximately 2 grams of flowers (buds) of similar size and from similar locations on each plant were harvested and dried for analysis. Samples were taken from each plant, air dried at approximately 100° F. in a Nesco American Harvest food dehydrator (Metal Ware Corp, WI, USA), then combined and homogenized into a single representative sample for each treatment group. These samples were submitted to a third-party lab (ProVerde, Milford, Mass.) for chemical analysis via mass spectrometry. Statistical analysis was performed on the results group-wise, and differences between treatment groups was observed as shown in FIG. 1 & FIG. 2. This quantitative procedure was performed again on day 42 of the reproductive cycle, when similar sized flower sections were harvested from each plant, dried at ~100° F., and submitted for chemical analysis via mass spectrometry (Botanacor, Denver, Colo.). In this case, three samples from each treatment group were submitted for chemical analysis via HPLC-MS. Statistically significant differences were observed in the concentration of secondary metabolites between treatment groups as shown in FIG. 3 & FIG. 4. On day 62, plants were harvested and hung to dry. Five samples of each group were taken for chemical analysis, again selecting similar top flower buds from each plant for consistency. These samples were dried at 95° F. for 85 hours prior to chemical analysis via HPLC-MS (Botanacore, CO). Again, statistically significant differences in secondary metabolite production were observed as shown in FIG. 5.

Statistical analysis for all quantitative data and observations were performed via two-sample Student's t-Tests assuming unequal variance using Microsoft Excel software. Data was graphed using box-and-whisker plots in Microsoft Excel software. Statistical significance was defined by a level of significance of $p \leq 0.05$ in the t-Test analyses.

Day 28 Assay Summary (FIG. 1&2): Total cannabinoids (+61.96%), total CBD (+61.49%), and total THC (+61.30%) concentrations were all significantly increased with applications of methyl jasmonate either alone or in conjunction with other elicitors at a $p \leq 0.05$ level of significance. Total terpene production was significantly increased (+35%) by applications of either MeJA and/or SA compared to control or si only at a $p \leq 0.05$ level of significance.

Day 42 Assay Summary (FIG. 3&4): Total cannabinoids (THC, THCA, CBD, CBDA) were significantly increased (+54.67%) at the $p \leq 0.001$ level of significance in treatment groups that received applications of MeJA either alone or in combination compared to the treatment groups that did not receive MeJA applications. Total CBDA was increased significantly (+54.99%) in plants that received MeJA treatments relative to plants that did not receive MeJA treatments at a $p \leq 0.0005$ level of significance. Total THC-A was increased significantly (+56.82%) in plants that received MeJA treatments relative to plants that did not receive MeJA treatments at a level of significance less than 0.0005. Plants that received all treatments showed significantly increased total cannabinoid concentrations (+56.31%) relative to the plants in the control group at a $p \leq 0.01$ level of significance. Plants that received MeJA treatments showed significantly increased (+41.49%) total cannabinoid concentration relative to plants in the control group at a $p \leq 0.005$ level of significance.

Day 63 Assay Summary (FIG. 5): Total cannabinoids (THC, THCA, CBD, CBDA) were increased significantly (+41.48%) in plants that received ALL elicitor treatments compared to control plants (+41.48%, $p \leq 0.05$). CBD content was significantly increased in plants treated with only MeJA (+23.27%, $p \leq 0.05$), MeJA and SiA (+18.96%, $p \leq 0.05$), and ALL elicitor treatments (+33.62%, $p \leq 0.01$) compared to control plants. CBDA content was significantly increased in plants treated with ALL elicitors compared to control plants (+42.67%, $p \leq 0.05$). Plants receiving some sort of MeJA treatment (MeJA only, MeJA with SiA, or ALL treatments) produced significantly higher (+58.64%, $p \leq 0.000001$) total cannabinoid contents than plants that did not receive any MeJA treatments (control, SA only, SiA only). Plants receiving some sort of MeJA treatment (MeJA only, MeJA with SiA, or ALL treatments) produced significantly higher (+33.11%, $p \leq 0.05$) total cannabinoid contents than plants in the control group. THCA was significantly decreased (−45.67%, $p \leq 0.05$) in SA treatment plants versus control plants.

MeJA treatments consistently increased cannabinoid production throughout the plant's flowering cycle, regardless of whether it was applied alone or in conjunction with other treatments. MeJA increased terpene production regardless of whether it was applied alone or in conjunction with other elicitor treatments. SA increased terpene production regardless of whether it was applied alone or in conjunction with other elicitor treatments, but decreased THCA production when it was applied independently without supplemental MeJA applications which could be valuable to hemp producers. The former findings could be valuable to both marijuana and hemp producers.

Example 2 Assessment of Secondary Metabolite Profile Alteration with Foliar Applications of the Elicitors MeJA and SA and Elicitor Primer SiA Sixteen (16) identical clones from a single mother plant (Happy Camper, CBDRx, USA) were rooted into 1" rockwool cubes (Grodan B.V.) prior to subsequent transplanting into 4" rockwool cubes (Grodan B.V). All sixteen plants were randomly divided into two groups, either a treatment group or a control group. All sixteen plants were maintained under identical conditions prior to and during the experiment. Plants were maintained in an isolated indoor growing environment on two elevated black plastic 4'×8' grow tables (Botanicare, Chandler, Ariz., USA) with eight plants per table; treatment plants were kept on one table and control plants on the other. Light was supplied via eight, 600-watt double-ended electronic high-pressure sodium lamps (Gavita International B.V) under a photoperiod of 12 hours of light per 24-hour day. Plants were irrigated as needed with tap water and fertilized consistently to maintain good health with a 4-20-39 base nutrient supplemented with 15-0-0 Calcium Nitrate and commercially available magnesium sulfate (Hydro Gardens International, Colorado Springs, Colo.) at a rate of 300-500 ppm (TDS) as needed. A microbial inoculant (Tribus Original, Impello Biosciences, Ft. Collins, Colo.) was applied at a rate of 1 mL/gallon of nutrient solution every watering to improve plant health. Temperatures in the growing environment were maintained at 75° F.±15° F. with a relative humidity range of 30-60%. Every 14 days of growth, all plants were supplemented with a fish protein hydrolysate at a rate of 5 ml/gallon of the previously mentioned nutrient solution to improve nutrition (Innate Bloom 4-2-1, Impello Biosciences, Colorado). Drip emitters and an automated watering system supplied water and nutrients equally to each plant.

7.5 mM solutions of MeJA (mixture of isomers) were prepared in 1-liter volumes using 93% purity MeJA stock solution (TCI America, CAS #1101843-02-0) added dropwise with a pipettor to reverse osmosis water in a 1-L Erlenmeyer flask while stirring. pH was not adjusted, and 100 µL of Tween-20 (VWR, CAS #9005-64-5) were added to the 1 L solution to improve homogenization. 0.5 mM solutions of SA were prepared from a 5 mM stock solution, which was prepared using Salicylic Acid powder (ThermoFisher Scientific, CAS #69-72-7), dissolved in reverse osmosis water and stored in a glass bottle. The plant-useable 0.5 mM solution was prepared by diluting 100 mL of the stock SA solution in 900 mL of reverse osmosis water and mixing with 100 µL, of Tween-20. The plant-useable 0.1 mM solution was prepared by diluting 20 mL of the stock SA solution in 980 mL of reverse osmosis water and mixing with 100 µL, of Tween-20. The 3 mM plant-useable Silicic Acid (SiA) solutions were prepared as needed from a 0.25M Silicic Acid stock solution, which was prepared with Silicic Acid powder (extra pure light DAB, Millipore Sigma, CAS #7699-41-4), dissolved in reverse osmosis water and stored in a sealed glass bottle. The stock solution was heated and stirred to homogenize prior to use and diluted in water to the desired final concentration of 3 mM. 100 µL/L of Tween-20 was added to the solution as a surfactant. Control plants received foliar applications of 100 µL/L of Tween-20 in reverse osmosis water only at the same volume and application timings as the treatment groups. Foliar spray treatments were performed with all environmental ventilation (exhaust and circulation fans) turned off to minimize overspray onto other treatment groups.

All eight (8) plants in the treatment group were subjected to applications of MeJA (7.5 mM), SA (0.1-0.5 mM) and SiA (3 mM) as foliar sprays. Treatments were applied individually on designated days. MeJA applications occurred every 14 days, starting on the seventh (7th) day of the reproductive cycle. SA applications occurred every 10 days, starting 17 days prior to initiation of the reproductive cycle and continuing every 10 days. The final two applications of SA were applied at a concentration of 0.1 mM to minimize the potential negative interactions between SA and MeJA applications; all applications prior to that were applied at a concentration of 0.5 mM SA. SiA applications were performed weekly, beginning 6 days after the initiation of the flowering cycle. Plants in the control group were sprayed with a solution of distilled water and 0.01% v/v Tween-20 on the days that treatment plants received applications and in the same fashion. Foliar applications of MeJA, SA, SiA, and control solutions were made with a 1-L volume low-pressure hand-pump sprayer (Mondi Products LTD, Canada). After 7 weeks, plants were harvested, and samples from each plant were taken from similar locations on the plant's flowering stalks, labeled, and air dried in a Nesco American Harvest food dehydrator (Metal Ware Corp, WI, USA) at 95° F. for 72 hours until fully dry.

Plant samples were submitted to a third-party lab (ProVerde, Milford, Mass.) for analysis. Cannabinoid contents were quantified via Convergence Chromatography (CC) and terpenes were analyzed via Gas Chromatography-Mass Spectrometry (GC-MS). All data was analyzed for statistical significance using two-sample Student's t-Test assuming unequal variance and plotted on box-and-whisker plots using Microsoft Excel software. Statistical significance was defined by a level of significance of $p \leq 0.05$ in the t-Test analyses.

Figure 6:
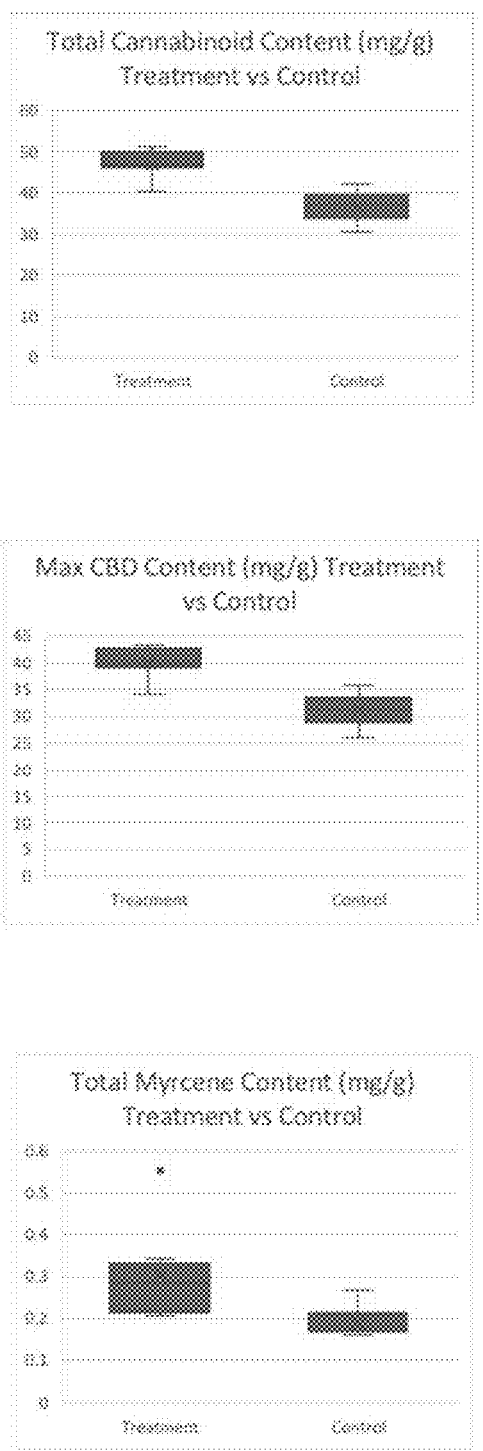
FIG. 6 is a first graph comparing MeJA+SiA+SA treatment vs. non-elicitor control measuring total Cannabinoid (mg/g) content; a second graph comparing MeJA+SiA+SA treatment vs. non-elicitor control measuring total CBD (mg/g) content; and, a third graph comparing MeJA+SiA+SA treatment vs. non-elicitor control measuring total Myrcene (mg/g) content.
Figure 7:
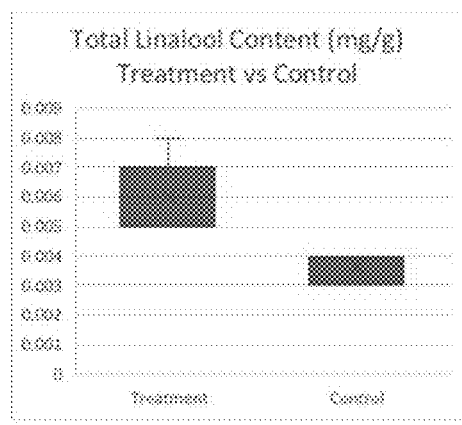
FIG. 7 is a first graph comparing MeJA+SiA+SA treatment vs. non-elicitor control measuring total Linalool (mg/g) content; a second graph comparing MeJA+SiA+SA treatment vs. non-elicitor control measuring total B-caryophyllene (mg/g) content; and, a third graph comparing MeJA+SiA+SA treatment vs. non-elicitor control measuring total Humulene (mg/g) content.
Figure 7:
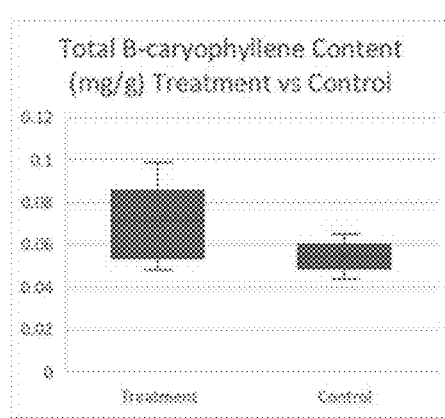
Figure 7:
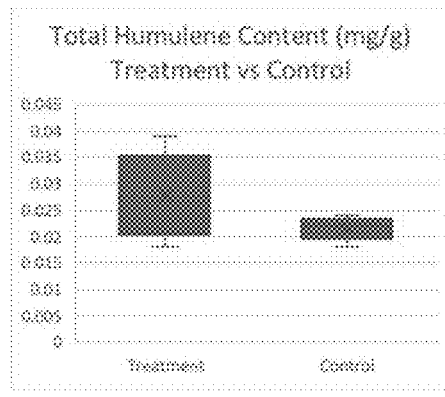
Figure 8:
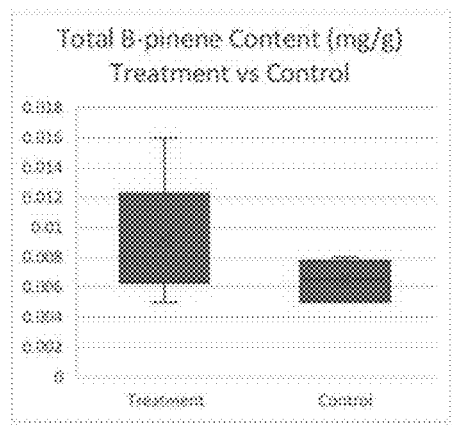
FIG. 8 is a first graph comparing MeJA+SiA+SA treatment vs. non-elicitor control measuring total B-pinene (mg/g) content; a second graph comparing MeJA+SiA+SA treatment vs. non-elicitor control measuring total a-pinene (mg/g) content; and, a third graph comparing MeJA+SiA+SA treatment vs. non-elicitor control measuring total Limonene (mg/g) content.
Figure 8:
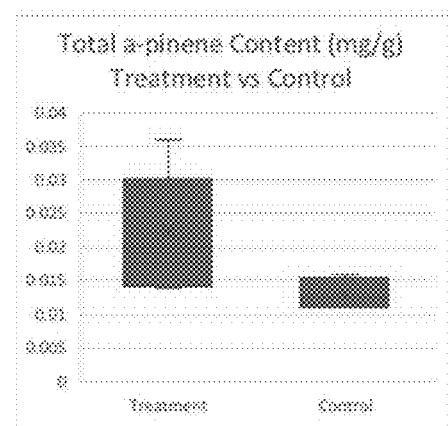
Figure 8:
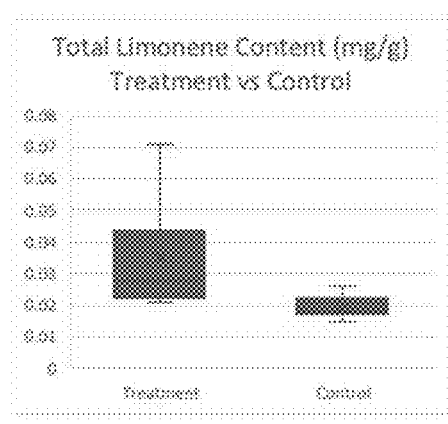

Total THC, total CBD, and total cannabinoids were all significantly increased (+32.75%, +27.98%, +28.14%) in the plants in the treatment group at a significance level of $p \leq 0.00005$ relative to the control group (FIG. 6). Total terpene concentrations were increased significantly in the treatment plants relative to the control plants at the following percentage increases and significance levels: Myrcene (+58.23%, $p \leq 0.02$) (FIG. 6), B-caryophyllene (+30.73%, $p \leq 0.02$) (FIG. 7), Linalool (+66.66, $p \leq 0.005$) (FIG. 7), Humulene (+29.65, $p \leq 0.05$) (FIG. 7), B-pinene (+43.13%, $p \leq 0.05$), a-pinene (+71.15%, $p \leq 0.01$), and Limonene (+82.46%, $p \leq 0.02$) (FIG. 8).

Example 3: Assessment of Secondary Metabolite Profiles in Plants Treated with MeJA, SA, SiA Simultaneously Based on the results of our initial experiments, an experiment was designed to test the efficacy and effectiveness of applying all three eliciting compounds as a single treatment. A single-treatment elicitor may prove more economically viable and applicable in a real-life cultivation setting. A six-plant experiment was designed, using identical clone stock from a single variety (WHY, CBDRx, USA), where three plants were assigned to the treatment group and three plants were assigned to the control group.

All plants were rooted in 1-inch rockwool cubes (Grodan B.V.) under identical conditions prior to transplant into 1-gallon black plastic pots filled with a 55% coco coir, 45% perlite media (Miller Soils LLC, CO, USA). Treatment plants were treated with a foliar application of 7.5 mM MeJA, 0.05 mM SA, and 3 mM SiA in the same solution. The solution was prepared by first adding 6 mL of a 0.25M SiA stock solution, which was prepared by dissolving Silicic Acid powder (extra pure light DAB, Millipore Sigma, CAS #7699-41-4) in reverse osmosis water, to approximately 488 mL reverse osmosis water on a stir plate. Then, 5 mL of a 0.5 mM SA stock solution (prepared using Salicylic Acid powder (ThermoFisher Scientific, CAS #69-72-7), dissolved in reverse osmosis water and stored in a glass bottle) was added to the solution while stirring. Next, 886.5 µL, of 93% stock MeJA (TCI America, CAS #1101843-02-0) was added to the mixture dropwise while stirring. Finally, 100 µL/0.5 L Tween-20 (VWR, CAS #9005-64-5) was added to the mixture to improve homogenization of the mixture and improve functionality on the plant. Control plants were treated with an aqueous water solution supplemented with 100 μL/0.5 L Tween-20 without pH adjustment on the same days as the treatment group. Treatment plants were removed from the growing environment prior to applications to avoid contamination of the control group. Treatments were made in the early morning hours within 30 minutes of daybreak. Treatments were made every 10 days, beginning on the 14th day of the reproductive (flowering) cycle and continuing until the 44th day of flower. Plants were harvested on day 51 of the flowering cycle.

Plants were maintained in an isolated indoor growing environment on an elevated black plastic 4'×8' grow table (Botanicare, Chandler, Ariz., USA). Light was supplied via eight, 600-watt double-ended electronic high-pressure sodium lamps (Gavita International B.V) under a photoperiod of 12 hours of light per 24-hour day. Plants were irrigated as needed with tap water and fertilized consistently to maintain good health with a 4-20-39 base nutrient supplemented with 15-0-0 Calcium Nitrate and commercially available magnesium sulfate (Hydro Gardens International, Colorado Springs, Colo.) at a rate of 300-500 ppm (TDS) as needed. A microbial inoculant (Tribus Original, Impello Biosciences, Ft. Collins, Colo.) was applied at a rate of 1 mL/gallon of nutrient solution every watering to improve plant health. Temperatures in the growing environment were maintained at 75° F.±15° F. with a relative humidity range of 30-60%. All plants were hand watered with 1 L of nutrient solution as-needed.

At the time of harvest, plants were cut at the stalk immediately below the first node. Plants were immediately weighed, and their weights were recorded. Contrary to the visual observations, treatment plants demonstrated an approximately 14% increase in weight, although this difference was not significant at the p≤0.05 level. Samples were analyzed for cannabinoids via HPLC and for terpenes via GC-MS (ProVerde Labs, Milford, Mass., USA). Plants were hang-dried at approximately 80° F. until moisture was removed, at which point each plant was submitted for chemical analysis. Plants in the treatment group showed an approximately 25% increase in dry weight, but this difference was also not significant at the p≤0.05 level of significance.

Statistical analysis for all quantitative data and observations were performed via two-sample Student's t-Tests assuming unequal variance using Microsoft Excel software. Data was graphed using box-and-whisker plots in Microsoft Excel software. Statistical significance was defined by a level of significance of p≤0.05 in the t-Test analyses.

Figure 9:
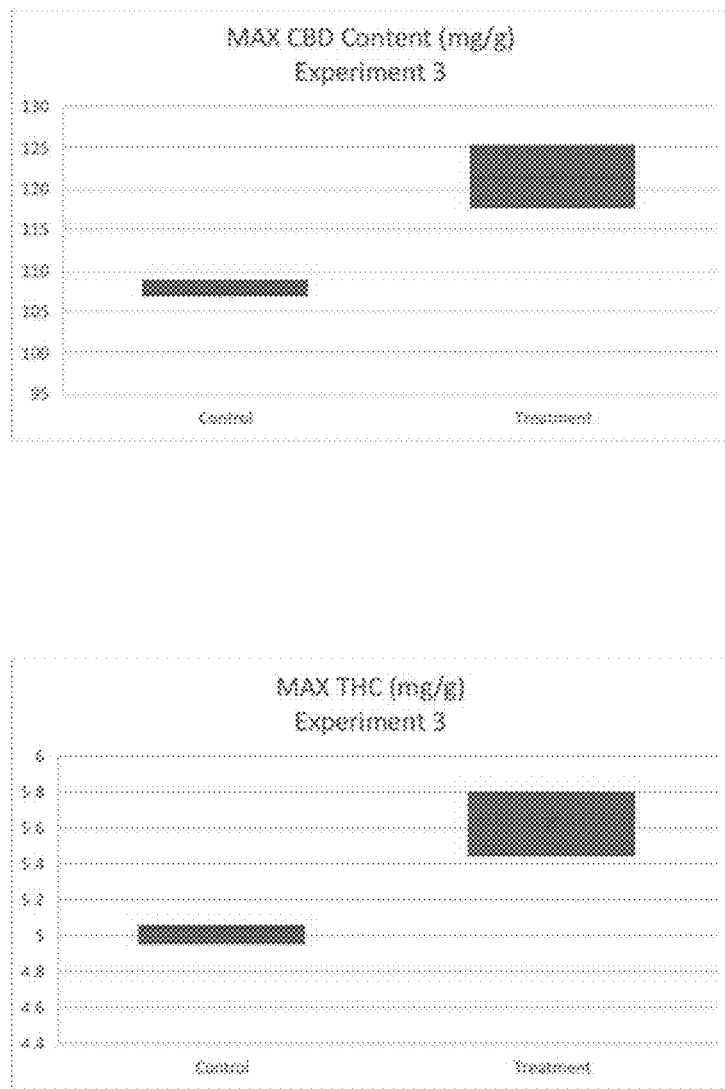
FIG. 9 is a first graph comparing MeJA+SiA+SA treatment vs. non-elicitor control measuring max CBD (mg/g) content; a second graph comparing MeJA+SiA+SA treatment vs. non-elicitor control measuring max THC (mg/g) content.
Figure 10:
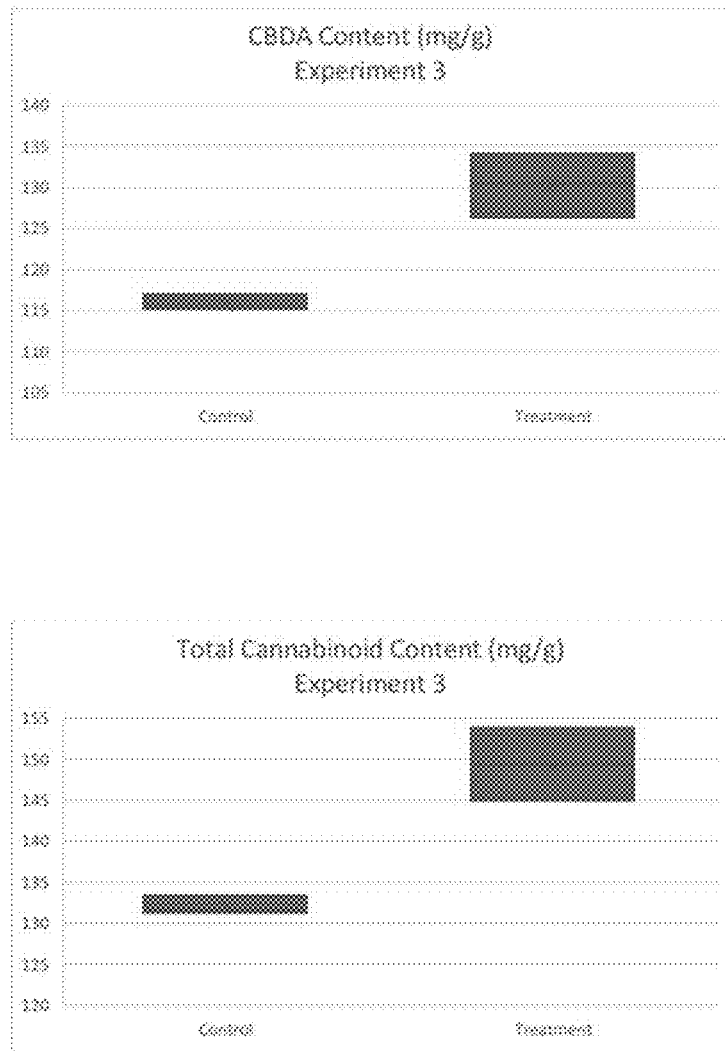
FIG. 10 is a first graph comparing MeJA+SiA+SA treatment vs. non-elicitor control measuring total CBDA (mg/g) content; a second graph comparing MeJA+SiA+SA treatment vs. non-elicitor control measuring total Cannabinoid (mg/g) content.
Figure 11:
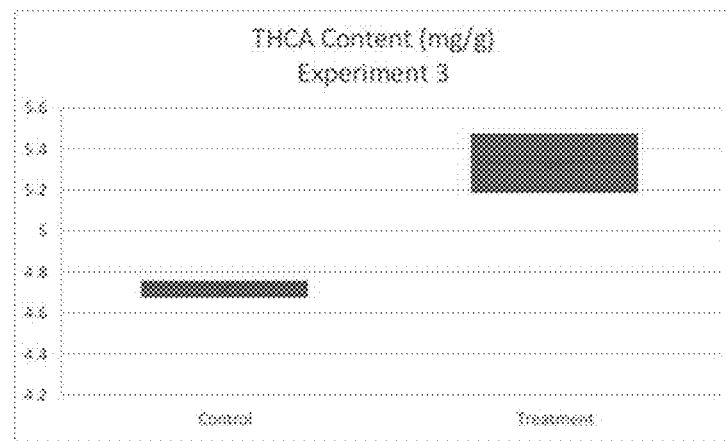
FIG. 11 is a first graph comparing MeJA+SiA+SA treatment vs. non-elicitor control measuring total THCA (mg/g) content; a second graph comparing MeJA+SiA+SA treatment vs. non-elicitor control measuring total CBD (mg/g) content.
Figure 11:
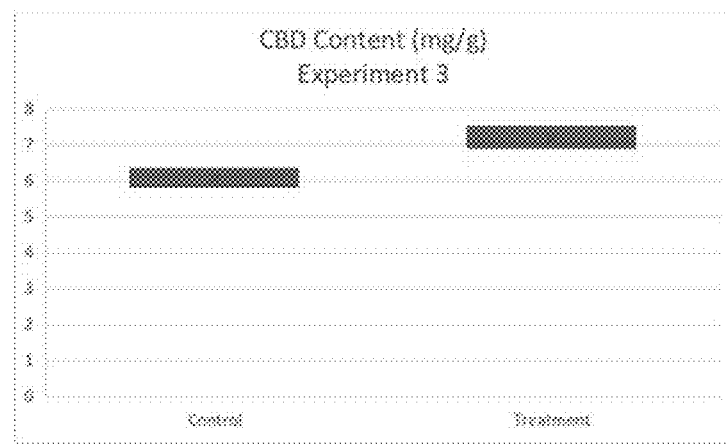
Figure 12:
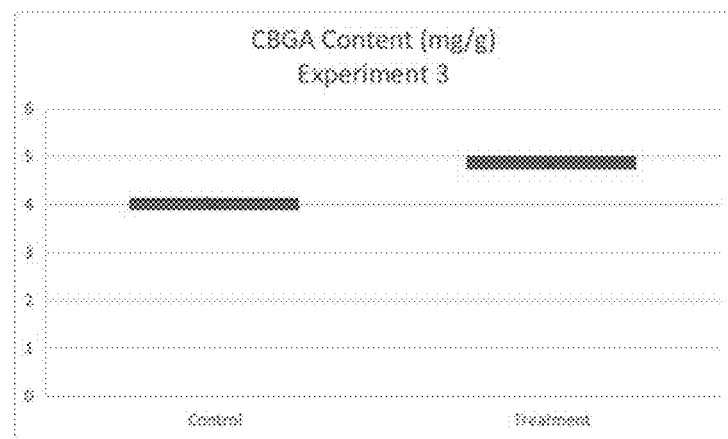
FIG. 12 is a first graph comparing MeJA+SiA+SA treatment vs. non-elicitor control measuring total CBGA (mg/g) content; a second graph comparing MeJA+SiA+SA treatment vs. non-elicitor control measuring total CBC (mg/g) content.
Figure 12:
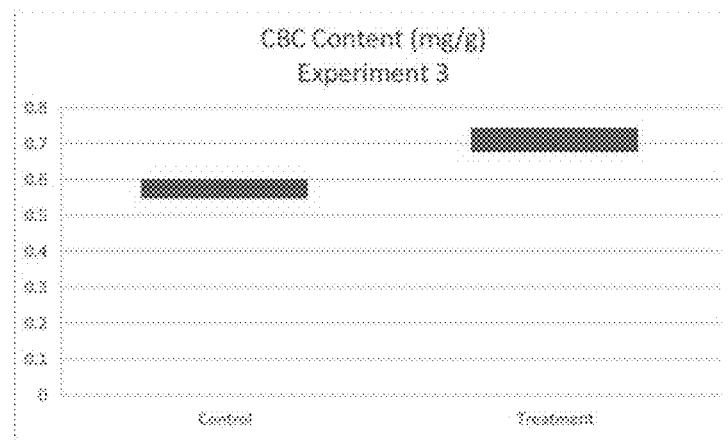
Figure 13:
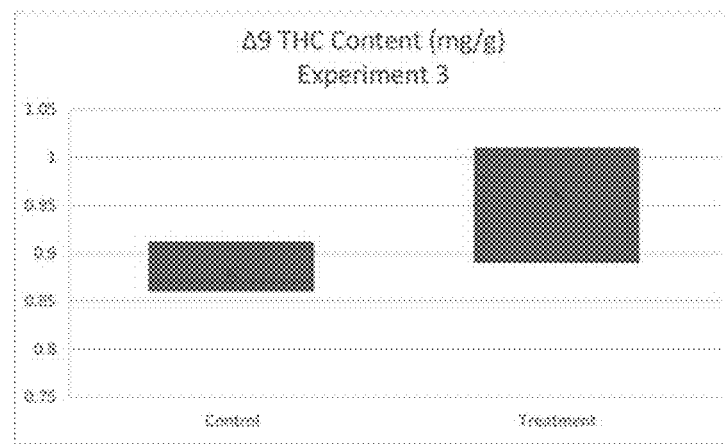
FIG. 13 is a graph comparing MeJA+SiA+SA treatment vs. non-elicitor control measuring 49 THC (mg/g) content.

Cannabinoid Summary: Chemical analysis of the flower material revealed significant differences in cannabinoid production between plants in the treatment and control groups. Plants in the treatment group showed significantly increased levels of the following cannabinoids at a confidence of p≤0.02: Max CBD (+12.84% increase), Max THC (+12.21% increase) (FIG. 9), CBDA (+12.56% increase), and Total Cannabinoids (+13.07% increase) (FIG. 10). Plants in the treatment group also demonstrated significantly increased levels of THCA (+12.92% increase) and CBD (+17.46% increase) (FIG. 11) at a confidence level of p≤0.01 and significantly increased levels of CBGA (+20.89% increase) at a confidence of p≤0.001 and CBC (+21.38% increase) (FIG. 12) at a confidence of p≤0.005. Plants in the treatment group did show an increase in Δ9-THC content (+9.09% increase) (FIG. 13) compared to the control group, but this difference was not significant. It should be noted that CBC and CBGA production increases are of significant importance and demonstrate that the effect of the elicitor treatments occurs upstream of the cannabinoid biosynthesis step, meaning that the effects of the treatments are not limited to cannabinoid production, which is in line with our previous findings. Moreover, the significant increases we saw in CBGA production in the treatment group is crucial to the production of other cannabinoids that may be expressed in different *Cannabis sativa* varieties, since CBGA is the necessary precursor to all other cannabinoids derived by the olivetolic acid pathway.

Figure 14:
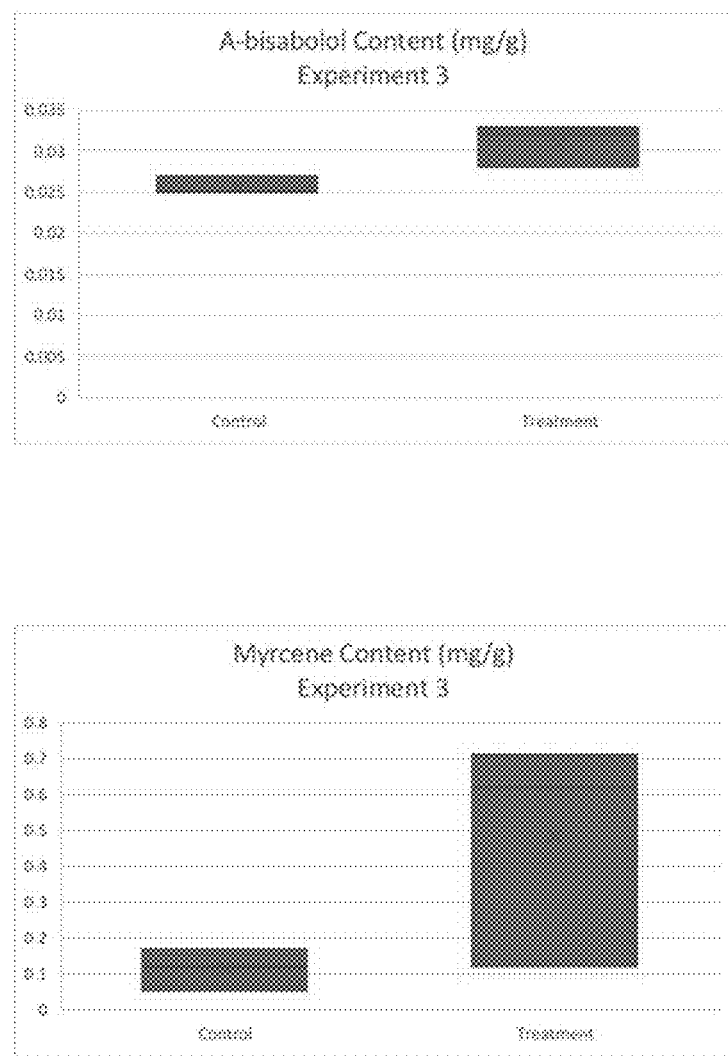
FIG. 14 is a first graph comparing MeJA+SiA+SA treatment vs. non-elicitor control measuring A-bisabolol (mg/g)

Terpene Summary: Chemical analysis of the flower material revealed significant increases (+20.62%) in the production of the terpene A-bisabolol (FIG. 14) in plants in the treatment group relative to plants in the control group at the p≤0.05 level of significance. Plants in the treatment group expressed increased concentrations of other terpenes including myrcene (+320.09%) (FIG. 14), Nerolidol-trans (+22.57%) (FIG. 15), B-caryophyllene (+14.38%), B-pinene (+45.60%) (FIG. 15), a-pinene (+37.73%) (FIG. 16), and limonene (+135.57%) (FIG. 16), and total terpene content (+93.75%) (FIG. 17) at p≤0.05.

Example 4: Assessment of Flower Yield in Plants Treated with Varying Concentrations of MeJA In our previous experiments, applications of MeJA demonstrated remarkable bioactivity and biostimulation in regard to the production of highly-valuable secondary metabolites such as cannabinoids. In turn, we designed an experiment to evaluate the efficacy and effectiveness of applying MeJA as a foliar spray to plants in different concentrations.

Fourteen (14) identical plants from clone (Charlotte x Tangie, CBDRx) were cultivated in 1-gallon black plastic pots in a media mixture of 55% coco coir, 45% perlite (Miller Soils LLC, Colorado). Plants were rooted in 1-inch A-OK rockwool cubes (Grodan, B.V.) uniformly prior to transplant into the 1-gallon pots. At the time of transplant, plants were also transitioned from a photoperiod of 18 hours of light per day to a photoperiod of 12 hours of light per day to induce flowering. Each plant was maintained with a standard, commercially available 3-part (4-20-39, CaNO3, MgSO4) nutrient solution at a recommended rate of 350 ppm (Hydro Gardens International, CO), hand watered as needed with 1 L per plant. Plants were randomly assigned to one of four groups, including three treatment groups and one control group: 0 mM MeJA (control), 5 mM MeJA (low), 7.5 mM MeJA (med), and 10 mM MeJA (high). Plants were maintained under identical environmental conditions on a 4'×8' black plastic table (Botanicare, USA) under 1200 w of light (Gavita Inc, Ne). A microbial inoculant (Tribus Original, Impello Biosciences, Ft. Collins, Colo.) was applied at a rate of 1 mL/gallon of nutrient solution every watering to improve plant health. Temperatures in the growing environment were maintained at 75° F.±15° F. with a relative humidity range of 30-60%.

Treatment groups were treated with the appropriate concentration of MeJA, prepared prior to application from a 93% MeJA stock solution (TCI America, CAS #1101843-02-0) diluted in reverse osmosis water and homogenized by mixing on a stir plate with the addition of 0.01% (100 μL/L) Tween-20 (VWR, CAS #9005-64-5) to aid in homogenization and to act as a surfactant, improving functionality when applied to the plant surfaces. MeJA mixtures were prepared in 250 mL Erlenmeyer flasks, capped with rubber stoppers while stored at room temperature to prevent volatilization of the MeJA out of solution. The mixture was fully homogenized and appear opaque white in color. For each use, the prepared flasks were shaken vigorously to ensure homogenization, then poured into micro-spray bottles with a capacity of 50 mL that produced a fine mist. A separate bottle was used for each treatment group and the control group sprays. Control groups were treated with a solution of water and 0.01% (100 µL/L) Tween-20 without MeJA. Neither the control nor treatment compositions were pH adjusted. Beginning on day 7 of the reproductive cycle, plants were treated in the early morning hours within 30 minutes of daybreak with a foliar spray until dripping from foliage, with treatments recurring every 14 days. Each plant was removed from the growing area for the spray treatment to reduce potential contamination between treatment groups and allowed to dry for less than 1 hour prior to returning to the growing environment.

No significant differences in weights between the treatment groups were observed. The highest recorded plant weight was in the 10 mM MeJA treatment group. This suggests that in planta exogenous foliar applications of MeJA to cultivated *Cannabis sativa* in our desired concentrations did not negatively impact plant performance.

The foregoing is considered as illustrative only of the principles of the invention. Furthermore, since numerous modifications and changes will readily occur to those skilled in the art, it is not desired to limit the invention to the exact construction and operation shown and described. Therefore, all suitable modifications and equivalents fall within the scope of the invention.

I claim:

1. A method of increasing content of a cannabinoid in a *Cannabis sativa* inflorescence, comprising:
   applying a composition comprising between 1 mM and 10 mM methyl jasmonate to a *Cannabis sativa* plant comprising an inflorescence.

2. The method of claim 1, wherein the composition comprises 7.5 mM methyl jasmonate.

3. The method of claim 1, wherein the composition is applied as a foliar spray or a root drench.

4. The method of claim 1, wherein the cannabinoid is cannabidiolic acid (CBDA) and the CBDA content of the *Cannabis sativa* inflorescence is at least 20% higher by weight compared to untreated plants.

5. The method of claim 1, wherein the cannabinoid is cannabidiolic acid (CBDA) and the CBDA content of the *Cannabis sativa* inflorescence is at least 50% higher by weight compared to untreated plants.

6. The method of claim 1, wherein the cannabinoid is cannabidiolic acid (CBDA) and the CBDA content of the *Cannabis sativa* inflorescence is at least 60% by weight higher compared to untreated plants.

7. The method of claim 1, wherein the cannabinoid is tetrahydrocannabinolic acid (THCA) and the THCA content of the *Cannabis sativa* inflorescence is at least 50% higher by weight compared to untreated plants.

8. The method of claim 1, wherein the method increases content of a terpene.

9. The method of claim 1, wherein the terpene content of the *Cannabis sativa* inflorescence is at least 30% higher by weight compared to untreated plants.

10. The method of claim 1, wherein the method comprises repeating the application of the composition comprising between 1 mM and 10 mM methyl jasmonate one or more times.

11. A method of increasing content of a cannabinoid in a *Cannabis sativa* inflorescence, comprising:
    applying a first composition comprising between 1 mM and 10 mM methyl jasmonate to a *Cannabis sativa* plant; and
    applying a second composition comprising between 1 mM and 5 mM silicic acid to the *Cannabis sativa* plant, wherein the first composition and the second composition are applied after flower onset.

12. The method of claim 11, wherein the first composition comprises 7.5 mM methyl jasmonate and the second composition comprises 3 mM silicic acid.

13. The method of claim 11, further comprising:
    applying a third composition comprising between 0.1 mM and 1 mM salicylic acid to the *Cannabis sativa* plant.

14. The method of claim 13, wherein the first, second, and third compositions are applied simultaneously.

15. The method of claim 11, wherein the first and second compositions are mixed together.

16. The method of claim 13, wherein the third composition is applied prior to flower onset.

17. The method of claim 13, wherein the third composition comprises 0.5 mM salicylic acid.

18. The method of claim 11, wherein the method increases a terpene.

19. The method of claim 18, wherein the terpene is selected from the group consisting of alpha-bisabolol, trans-nerolidol, humulene, beta-caryophyllene, beta-pinene, alpha-pinene, limonene and myrcene.

20. A method of decreasing tetrahydrocannabinolic acid (THCA) content and increasing a terpene in *Cannabis sativa* inflorescence, comprising:
    applying a composition comprising between 0.1 mM and 1 mM salicylic acid to a *Cannabis sativa* plant, wherein the composition is applied after flower onset.

21. The method of claim 20, wherein the composition comprises approximately 0.5 mM salicylic acid.

* * * * *